United States Patent [19]

Sandin

[11] Patent Number: 6,067,315

[45] Date of Patent: May 23, 2000

[54] METHOD AND APPARATUS FOR COHERENTLY-AVERAGED POWER ESTIMATION

[75] Inventor: Tomas Sandin, Stockholm, Sweden

[73] Assignee: Telefonaktiebolaget LM Ericsson, Stockholm, Sweden

[21] Appl. No.: 08/985,198

[22] Filed: Dec. 4, 1997

[51] Int. Cl.⁷ .............. H04B 15/00; H04K 1/00; H04L 27/30

[52] U.S. Cl. .............. 375/206; 375/200; 375/335; 375/344; 370/209; 370/335; 370/342

[58] Field of Search ............................................. 375/206

[56] References Cited

U.S. PATENT DOCUMENTS

| | | | |
|---|---|---|---|
| 5,056,109 | 10/1991 | Gilhousen et al. | 370/342 |
| 5,257,283 | 10/1993 | Gilhousen et al. | 375/200 |
| 5,265,119 | 11/1993 | Gilhousen et al. | 370/335 |
| 5,297,161 | 3/1994 | Ling | 375/200 |
| 5,452,331 | 9/1995 | Shihabi et al. | 375/324 |
| 5,485,486 | 1/1996 | Gilhousen et al. | 375/335 |
| 5,640,431 | 6/1997 | Brukert et al. | 375/344 |
| 5,790,515 | 8/1998 | Lipa | 370/209 |
| 5,799,011 | 8/1998 | LaRosa et al. | 370/335 |

*Primary Examiner*—Stephen Chin
*Assistant Examiner*—Paul Rupert
*Attorney, Agent, or Firm*—Burns, Doane, Swecker & Mathis, L.L.P.

[57] ABSTRACT

A method for power estimation in DS-CDMA schemes employing non-coherent detection is disclosed. By buffering channel complex amplitudes and, subsequent to non-coherent detection of a received symbol, coherently averaging the complex amplitudes retrieved, an accurate power estimate is achieved. By further estimating the Doppler frequency in an alternate embodiment, an even better estimate can be achieved. The amplitude of the channel can be regarded as constant over a longer time period than merely one symbol and the coherent averaging generates more accurate power estimates than that achieved by non-coherent averaging. By estimating the Doppler frequency and only averaging coherently over a period no longer than the coherence time an even better estimate is achieved. The variance of the estimates is decreased and the effect of biasing is increasingly limited.

15 Claims, 7 Drawing Sheets

$$\hat{P}\left(\frac{jl}{m}\right) = \frac{1}{m/l} \sum_{n=0}^{m/l} \left| \frac{1}{l} \sum_{j=1}^{l} x_i, (n-1)l+j \right|^2$$

A. Here, m symbols are averaged non-coherently (state of the art)

B. Here, the coherence time allows for a coherent averaging over l symbols. This is done m/l time for an estimation period (m symbols). The m/l coherent averages are then averaged non-coherently.

C. Same as B, but the coherence time allows for coherent averaging over l=3 symbols and the m/l coherent averages are then averaged non-coherently.

D. Here, the coherence time extends over the whole power estimation period. This is the basic idea of the present invention $$\hat{P}\left(\frac{jl}{m}\right) = \frac{1}{m/l} \sum_{n=0}^{m/l} \left| \frac{1}{l} \sum_{j=1}^{l} x_i, (n-1)l+j \right|^2$$

A. Here, m symbols are averaged non-coherently (state of the art)

m=6
m/l=6

B. Here, the coherence time allows for a coherent averaging over l symbols. This is done m/l time for an estimation period (m symbols). The m/l coherent averages are then averaged non-coherently.

m=6
m/l=3 l=2

C. Same as B, but the coherence time allows for coherent averaging over l=3 symbols and the m/l coherent averages are then averaged non-coherently.

m=6
m/l=2 l=3

D. Here, the coherence time extends over the whole power estimation period. This is the basic idea of the present invention m=6
m/l=1 l=6

FIG. 7

METHOD AND APPARATUS FOR COHERENTLY-AVERAGED POWER ESTIMATION

FIELD OF THE INVENTION

The present invention relates generally to radio communication systems and, more particularly, to a method and apparatus for power estimation in a Code Division Multiple Access (CDMA) communication system.

BACKGROUND OF THE INVENTION

Spread Spectrum (SS) is a communication scheme that is advantageous for several applications. In the past, spread spectrum was used in military applications because of its resistance against jamming. More recently, spread spectrum has formed the basis of Code-Division Multiple Access (CDMA) communication systems, some which have been applied in cellular radio telephone environments due to its advantageous resistance to fading.

In a typical CDMA system, an information datastream to be transmitted is impressed upon a much higher bitrate datastream generated by, e.g., a pseudorandom code generator. The information datastream and the higher bitrate datastream are typically multiplied together, and such combination of the higher bitrate signal with the lower bitrate information signal is called direct-sequence (DS) spreading of the signal. Each information datastream or channel is allocated a unique spreading code. A plurality of SS signals are transmitted upon radio frequency carrier waves and jointly received as a composite signal at a receiver. Each of the SS signals overlaps all of the other SS signals, as well as noise related signals, in both frequency and time. By correlatirg the composite signal with one of the unique spreading codes, the corresponding information signal can be isolated and despread at the receiver.

The receiver processes the received signal to produce an estimate of the original message signal. This process is referred to as demodulation. In a Direct Sequence CDMA system, demodulation is commonly performed in a RAKE receiver. A RAKE receiver is a type of receiver where several propagation paths can be detected and combined, or "raked", together before decoding. These different propagation paths of a radio signal occur because of reflections from buildings or other large nearby obstacles. This combination or "raking" is an advantageous way of utilizing as much of the transmitted energy as possible in the detection.

A detector can either operate to coherently detect a received signal or it may operate to non-coherently detect a received signal. In a coherent detection scheme the channel response is determined such that the effects of phase and magnitude distortions caused by the communication channel can be compensated for with matched filters. This is typically done by first transmitting a pilot signal. For example, in a cellular communication system, the forward channel, or down-link, may be coherently detected if the base station transmits a pilot signal. This is a known signal and the receiver at the mobile stations can then use this pilot signal to estimate the channel phase and magnitude parameters, to subsequently perform a coherent detection.

In a non-coherent detection scheme however, there is no compensation for phase distortions. For diversity reception, there is thus a non-negligible combining loss in non-coherent detection schemes, Consequently, a coherent detection requires typically less signal to noise ratio than that required by a non-coherent detector for the same bit error rate.

In an uplink channel, from mobile to base station, using a pilot signal may not be feasible. For example, the CDMA system specified by the TIA/EIA/IS-95 standard promulgated by the Telecommunications Industry Association and the Electronic Industries Association uses Direct Sequence spreading and non-coherent detection in the uplink. The IS-95 standard specifies conventional CDMA, in which each user demodulates its received signal without considering other users' signals, in a cellular communication system.

A typical spread spectrum transmission involves expanding the bandwidth of an information signal, transmitting the expanded signal, and recovering the desired information signal by remapping the received spread spectrum signal into the original information signal's bandwidth. The quality of the recovery of the transmitted information signal from the commuication channel is measured by the error rate for the energy per bit over noise spectral density, $E_b/N_0$. As the error rate increases, the quality of the signal received by the receiving party decreases. Most communication systems are designed to limit the error rate to an upper bound, or maximum, so that degradation of the received signal is limited.

In a Direct Sequence CDMA system, e.g., IS-95, the error rate is related to several factors. One of these is the interference level of the channel, which is directly related to the number of simultaneous users within the same frequency bandwidth. A received signal intended for a particular mobile station is experienced as interference to all other mobile stations receiving within the same bandwidth in a cell.

The error rate is also affected by the received signal power level. In some spread spectrum systems (e.g. cellular systems ) a central communications site attempts to detect or receive more than one signal from a particular bandwidth of the spectrum. This could typically be a base station. The site then adjusts its receiver components to optimally receive signals at a particular received signal power threshold level. The signals having a received power at or near the threshold level are optimally received while those signals not having a received power at or near the threshold level are not optimally received.

If all the mobile transmitters' powers received at a receiver are equal to one another, the signal to noise ratio can be maintained above the threshold by not allowing the number of mobile stations in a cell to exceed a certain number. Then, the reception is optimal from a system view, not necessarily from an individual user's viewpoint. Optimal can be defined, for example, to be the maximum number of users at a particular maximum error rate. In this sense, a non-optimally received signal tends to have a higher error rate or cause unnecessary interference to other receivers. Either of these consequences can result in the system further limiting the number of simultaneous users in the frequency bandwidth associated with a particular site.

Thus it is desirable to maintain the received signal power level at or near the particular power threshold level. This can be done by adjusting the transmitted signal power level. By using power control schemes to maintain the received signal power levels at a particular power level, the number of simultaneous users can be maximized for a particular maximum error rate.

As mentioned above, particular transmitted signals in a CDMA cellular system can be retrieved by despreading. A composite signal representative of the sum of signals in a certain frequency bandwidth can be despread with user specific spreading codes related to a particular transmitted signal which is to be retrieved. When user specific spreading codes are orthogonal to one another, the received signal can be correlated with a particular user spreading code such that only the desired user signal related to a particular spreading code is enhanced while the other signals for all the other users will not be enhanced.

Various spreading codes exist which can be used to separate data signals from one another in a CDMA system. Also, some types of codes can be utilized for coding the information signal prior to modulation. Data signals are often channel coded to enable transmitted signals to better withstand the effects of various channel impairments, such as noise, fading, and jamming. One method is to have one code symbol correspond to one modulation symbol. This is called coded modulation.

One type of orthogonal code, which can be used for both of the above, is a Walsh code. A Walsh code corresponds to a single row or column in a Hadamard matrix. Walsh codes are orthogonal and have zero cross correlation. They are used both for user separation and coded modulation. For example in the uplink of an IS-95 system, M-ary orthogonal modulation with M=64 utilizing Walsh symbols is specified. On the other hand, in IS-95 downlink, Walsh codes are used for channel separation.

Walsh codes, or sequences, are powerful to use because there exists easily implemented methods of performing correlation calculations. These are usually performed in a Fast Walsh Transform (FWT), or Fast Hadamard Transform (FHT), a function which correlates each input Walsh symbol against all possible Walsh symbols. The output of the FWT/FHT is M correlation values, where M corresponds to the number of possible Walsh symbols. E.g., in 64-ary orthogonal modulation, the number of possible Walsh symbols is 64. One type of FWT is described in U.S. Pat. No. 5,357,454 to Dent for "Fast Walsh Transform Processor".

As mentioned above, the number of simultaneous users within the same frequency bandwidth is limited. The performance of the system is highly dependent on the received power of a certain signal This means that accurate power control is especially important for DS-CDMA communication systems, and thus there is a need to accurately estimate the received power in a receiver for use as input in a power control algorithm.

In FIG. 1 is generally shown part of a RAKE receiver and a power estimation function as could be implemented in a base station in a DS-CDMA communication system employing non-coherent detection. The receiver receives different signal paths and passes the signals through different delay lines $D_1, \ldots D_p$, in 102 to align them in time. Further, a multiplication with the user specific PN sequences is performed 104 to retrieve a certain user3 s signal. Next, an integration is performed 106 over the time for a Walsh symbol $T_s$ followed by a Fast Walsh Transform and generation of complex correlation values indicating the correlation between the received Walsh words and all possible Walsh words.

It should here be noted that if some non-coherent modulation method is applied other than M-ary orthogonal modulation, of course no Walsh Transform is performed. One such example is a system employing Differential Binary Phase Shift Keying, DBPSK.

FIG. 1 is representative of such a scheme as well, and although the following description will be held mainly with respect to M-ary orthogonal modulation, other non-coherent modulation schemes are also considered.

For each received signal path, i.e., each "finger" in the RAKE receiver, the complex correlation values are absolute squared 108 and combined 110 with the corresponding symbol values for the other received signal paths, and a decision variable is generated at defection block 112 that is calculated based on what symbol was most likely sent.

As indicated in FIG. 1, the input to the power estimator 114 is based on values of the received signal after squaring and combining. Usually, power estimation is performed by averaging m consecutive detected symbols. This averaging is thus performed non-coherently, since no phase information is present in a squared channel complex estimate. The power estimation 114 for M-ary modulation is usually calculated as;

$$\hat{P}\left(\frac{j}{m}\right) = \frac{1}{m}\sum_{j=1}^{m} \max\left(\sum_{i=1}^{p} |\overline{y}|_{i,j}^2\right),$$

where p is the number of detected paths and $\overline{y}_{i,j}$ is the jth vector at delay $D_i$ consisting of a real and imaginary value for every possible symbol that can be transmitted plus noise. This power estimation method tends to generate overestimates of the received signal power and the variance also tends to be large.

For the case of a system employing a DBPSK scheme, the power estimation will be calculated as $$\hat{P}\left(\frac{j}{m}\right) = \frac{1}{m}\sum_{j=1}^{m} \left|\sum_{j=1}^{p} \overline{x}_{i,j} \cdot \overline{x}_{i,j-1}\right|,$$

where $\overline{x}_{i,j}$ is the jth complex amplitude of the channel, at delay $D_i$ modulated with the transmitted bit plus noise and p is the number of RAKE fingers currently used.

In addition, other power estimation methods for CDMA communication systems exist in the prior art. For example, in U.S. Pat. No. 5,297,161 to Ling for "Method and Apparatus for Power Estimation in an Orthogonal Coded Commuication System" is described one way of performing power estimation of received orthogonal symbols in non-coherent detection schemes by correlating an input data vector of the received signal with a set of mutually orthogonal codes to generate a set of output values. Each correlation value corresponds to a measure of confidence that the input data vector is substantially similar to one of the orthogonal codes from within the set of mutually orthogonal codes.

An estimate of the power of the received signal is generated as a nonlinear function of the set of output values. The largest of these values is then chosen. These largest values gives estimates of the signal power and they are then non-coherently averaged over six received Walsh symbols. This is the same procedure as the above, illustrated in FIG. 1. In addition, the other 63 values for every Walsh symbol are used to provide estimates of the noise power. These values are then used to compensate the average estimated signal power according to a particular function.

The method relies on estimation of power for the wanted signal, compensating for the power of the non-wanted signals. This means that a variance is calculated wherein other users' contributions to the overall noise have been considered. The estimation is performed over 1.25 ms non-coherent averaging periods, i.e. a time corresponding to 6 Walsh words. Without the compensation function the overestimation of the power is significant. By the compensation function the accuracy of the estimates is increased. The power estimation method in the Ling patent is illustrated in FIG. 2. The RAKE receiver scheme is the same as that illustrated in FIG. 1.

SUMMARY OF THE INVENTION

It is an object of the present invention to provide a power estimation method with coherent averaging of received symbol powers in a detection system employing non-coherent detection, e.g., a system pursuant to IS-95. By performing coherent averaging, the problems with overestimation, often experienced in non-coherent averaging schemes, are limited and the variance of the estimates if substantially decreased.

To accomplish the coherent averaging, the complex amplitudes of the received symbols output from the Walsh decoder are buffered and then, subsequent to the following non-coherent detection, retrieved and averaged coherently for a more accurate power estimate than that usually achieved by non-coherent averaging. In one embodiment, an estimate of the Doppler frequency for the received signal is utilized to allow a selection of the optimum number of received symbols to include in the coherent averaging. These groups of coherently averaged power estimates can then, in turn, be non-coherently averaged to generate a power estimate for the number of symbols that the power control loop is designed for.

One advantage with the invention is that accurate power estimates is achieved without the need of any compensation function. Another advantage with the present invention is that it results in increased accuracy in power estimation which allows an increase in the number of users in the system, while maintaining the error rate.

BRIEF DESCRIPTION OF THE DRAWINGS

The present invention will now be described in more detail with reference to preferred embodiments, given only by way of example, and illustrated in the accompanying drawings, in which;

FIG. 7A–D is a diagram illustrating coherent averaging performed over varying number of symbols.

DETAILED DESCRIPTION

In the following description a novel method and apparatus for power estimation in a non-coherent DS CDMA detection system is presented. The basis of the power estimation method is found in the fact that coherently averaged power estimates will produce less variance and more reliable power control than that achieved by non-coherently averaged powers.

As described in the background, the power estimate is usually done by averaging m consecutive detected symbol powers. The measurement interval is then given by $mT_s$. Instead of absolute squaring the symbol estimate directly after the Walsh Transform, i.e., what is typically done in prior art methods, the preferred embodiment first accumulates the radio channel complex correlation values for all the possible symbols for m consecutive modulation intervals. After combining and detection it is possible to retrieve the channel complex amplitudes for the selected Symbols and perform the averaging on these amplitudes, which contain phase information, instead of estimating over the absolute squared values which contain only power information.

Figure 3:
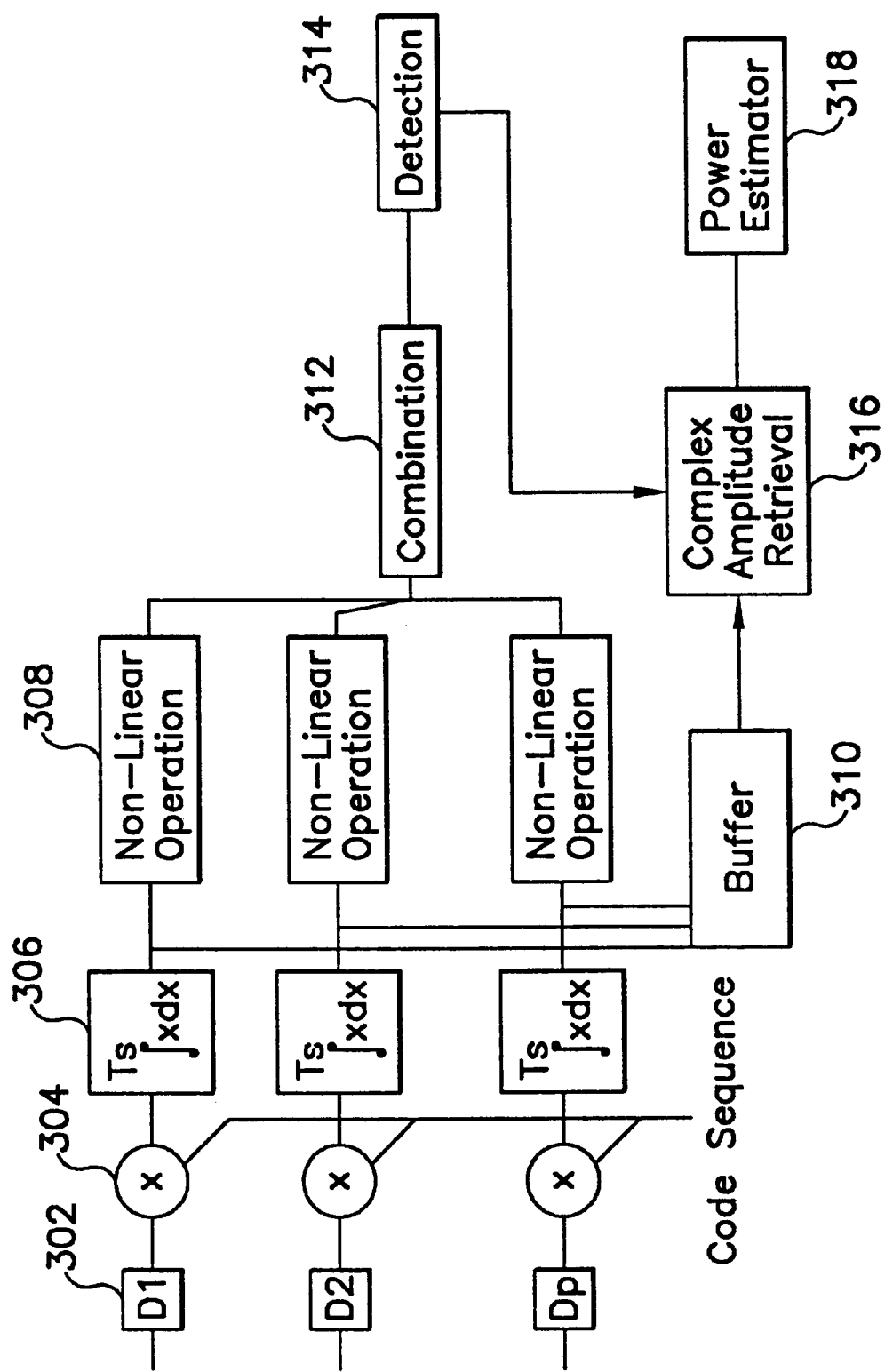
FIG. 3 is an overview of different functional elements in a RAKE receiver in a preferred embodiment of a DS-CDMA system according to the present invention.

In FIG. 3 is shown a RAKE receiver and power estimation part according to one embodiment of the present invention. For simplicity, the embodiments below will be described with respect to a system equal, or similar, to the IS-95 specification, although the invention is not restricted to such systems.

Signals from different propagation paths are received in a RAKE receiver. Appropriate time delays D are inserted 302 to align the signals. An extraction of a wanted signal from the received composite signal is performed 304 by correlating a specific user's PN-sequence of the wanted signal. After the PN-correlation the signal is Walsh Transformed. The output of the Walsh Transform is a number of complex correlation values, the number corresponding to the number of possible Walsh symbols. In IS-95 is specified 64-ary orthogonal modulation in the uplink and thus there are 64 different possible Walsh symbols and the same number of complex correlation values for each symbol or modulation period. These complex correlation values are buffered in a buffer, 310, and the complex correlation values are then absolute squared 308 and combined 312 for detection 314.

One method for detection 314 is to combine the squared symbol powers for each propagation path with the other propagation paths and select the largest to determine what symbol was most likely sent. The detector serves the Power Estimation with the index [1..64] for the symbol most likely sent and the complex amplitude with the corresponding index can be retrieved in 316. In 318, the averaging over m symbols is performed but now on complex values $\underline{x}_{i,j}$ according to the following formula:

$$\hat{P} = \sum_{i=1}^{p} \left| \frac{\sum_{j=1}^{m} x_{i,j}}{m} \right|^2$$

where m is the number of modulation intervals to average over and p is the number of RAKE fingers.

Figure 4:
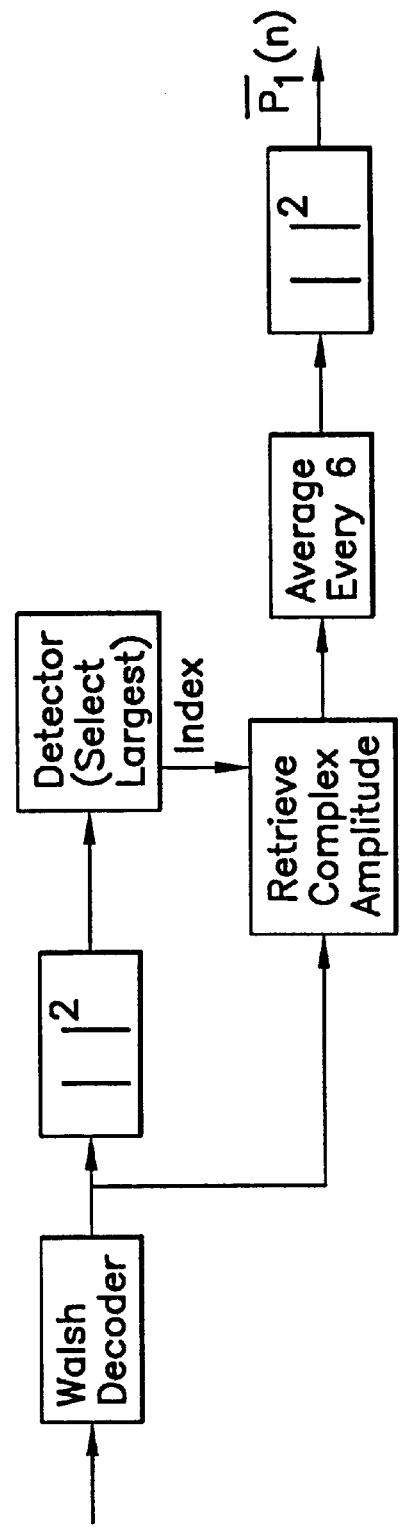
FIG. 4 is a flowchart illustrating the method of power estimation which could be performed on one RAKE finger in the system of FIG. 3.

FIG. 4 shows a flowchart of how power estimation is performed in the present invention for a RAKE receiver with one RAKE finger. After the correlation, the largest of the 64 values from the Walsh decoder is selected. This value will then have an index from e.g. 0 to 63. The detector detects the Walsh code with the largest/highest correlation values and forwards the index [0..63] for the complex amplitude value of the same. Averaging is performed over m symbol periods prior to the absolute squaring to provide an estimate of the signal power. In the IS 95 standard the averaging is performed over 6 symbol powers (i.e. using the present invention m=6).

Figure 1:
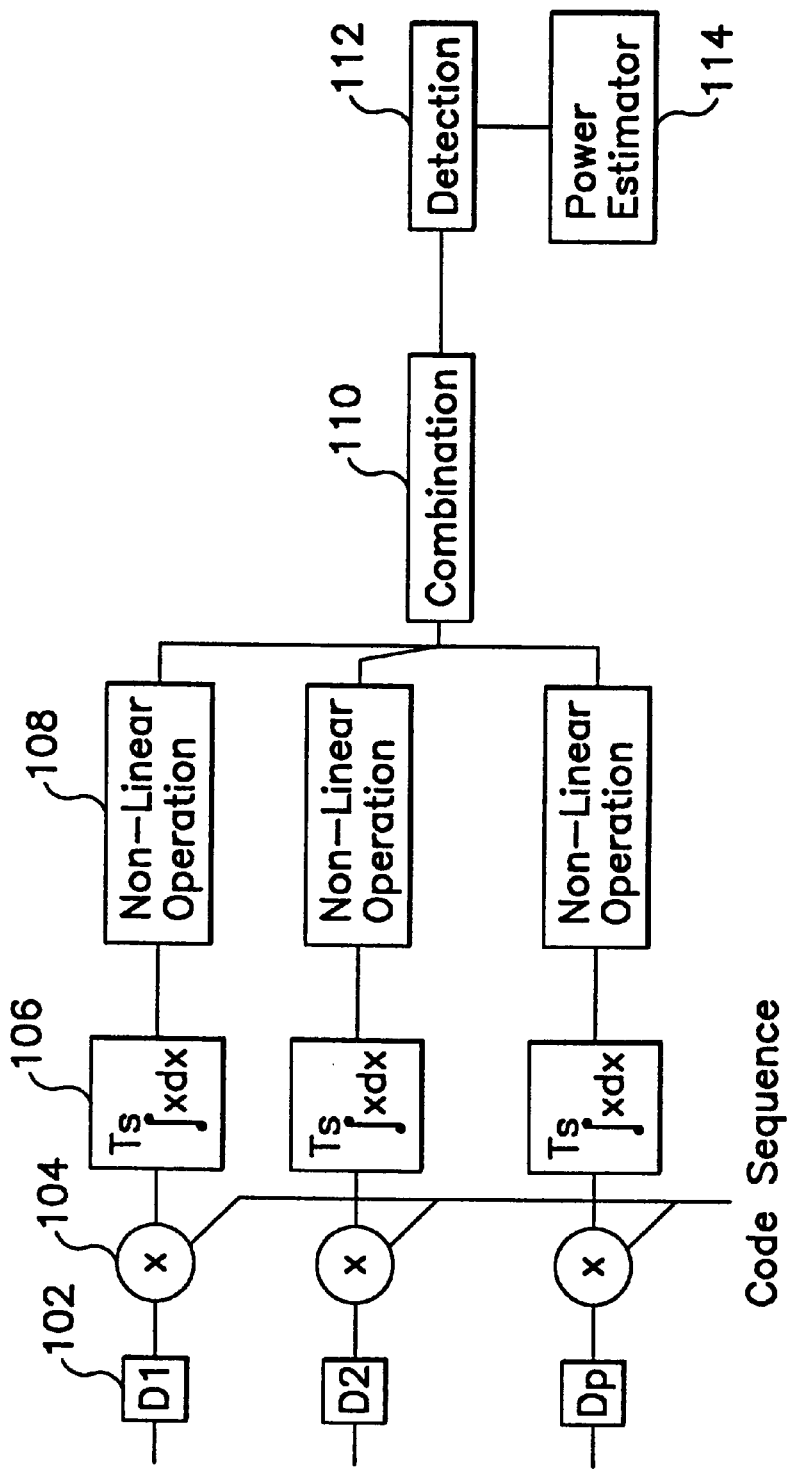
FIG. 1. is an overview of different functional elements in a RAKE receiver in a DS-CDMA system.
Figure 2:
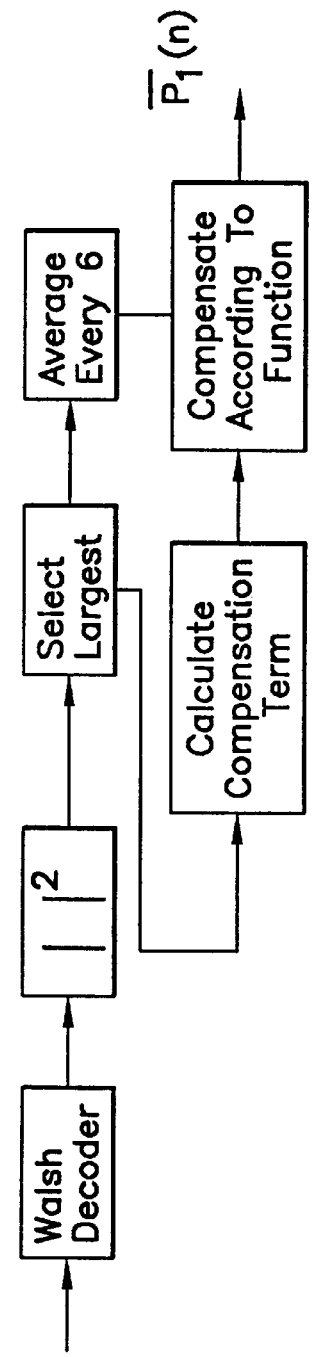
FIG. 2 is a flowchart illustrating a current method of power estimation which could be performed in the system in FIG. 1.

In the prior art method of FIG. 2, averaging of 6 symbol power estimates is used to estimate the power, whereas in the present invention the channel complex amplitudes, averaged prior to squaring the absolute value, are used. This absolute value eliminates the need to calculate any compensation using the other 63 values from the Walsh decoder. Instead of averaging every 6 real values for the maximum correlation value from the Walsh decoder, the present invention averages every 6 radio channel complex amplitudes of the signal corresponding to the highest value from the Walsh decoder. In the equation above, p=1, corresponding to one RAKE finger.

Figure 5:
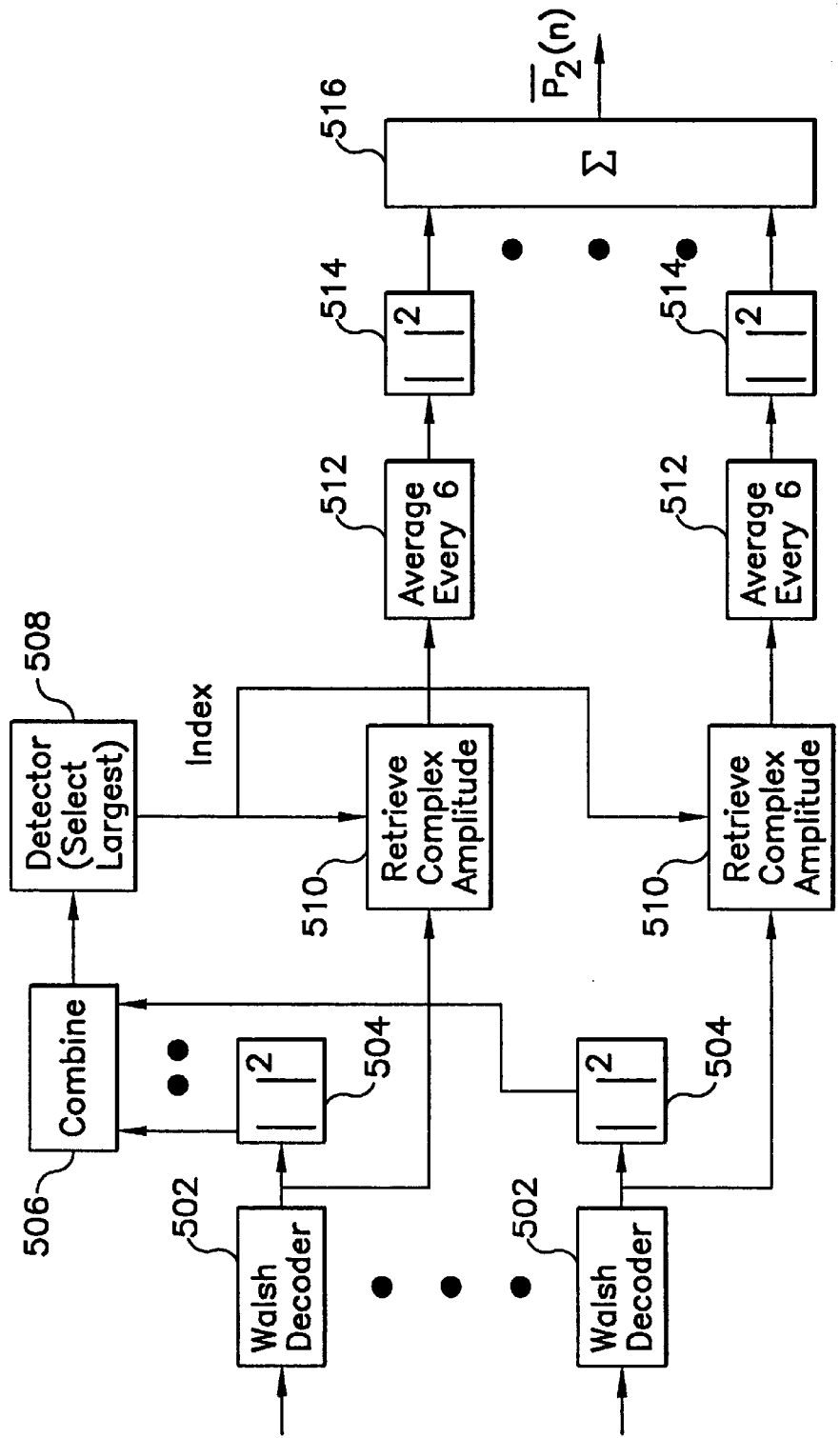
FIG. 5 is a flowchart illustrating the method of power estimation which could be performed on a plurality of RAKE fingers in the system in FIG. 3.

In FIG. 5 is shown a flowchart of how the power estimation is performed according to the present invention. In 502 the complex correlation values are determined. These values are buffered 510 for later retrieval. In 504 the values are absolute squared for each propagation path and combined in 506 for use in the detection 508. The detector selects the Walsh symbol with the largest symbol power and forwards the index [0..63] of that symbol to the power estimation part 510 which retrieves the complex amplitude for the selected Walsh symbol. It then averages m symbols, (in IS-95, m=6) in 512 and then absolute squares the averages, 514, before summing 516 the averages of the different propagation paths to generate a coherently averaged power estimate. This power estimate is then forwarded to the power control loop in the communication system.

In another embodiment of the present invention, the number of modulation periods to average coherently over is not fixed but selectable. The optimum averaging should be performed coherently over a number of symbols corresponding to the coherence time, $T_{coh}$, i.e., the time during which the channel amplitude can be regarded as constant, else it would be performed non-coherently. If Automatic Frequency Control (AFC) is implemented in the system, the coherence time can be estimated to be about 10% of the inverse of the Doppler frequency, $f_D$, and thus an estimation of the Doppler frequency can give the number of symbols, 1, over which to be coherently averaged for optimum performance. (The AFC corrects the frequency error between the clocks in a base station and mobile station that typically is present.)

The coherence time, $T_{coh}$ is $$\frac{1}{\max(f_D)}.$$

Using the 10% design rule in the case of AFC, we get a $T_{cohAFC}$ that can be expressed as $$T_{cohAFC} \geq 0.1 \times \frac{1}{\max(f_D)}$$

During this interval the accumulation process at each RAKE finger should be coherent for optimum estimation performance. However, the power control averaging time specified by m does not change and thus, over m symbols, m/l such averages must be calculated. These m/l periods are then combined non-coherently.

Figure 6:
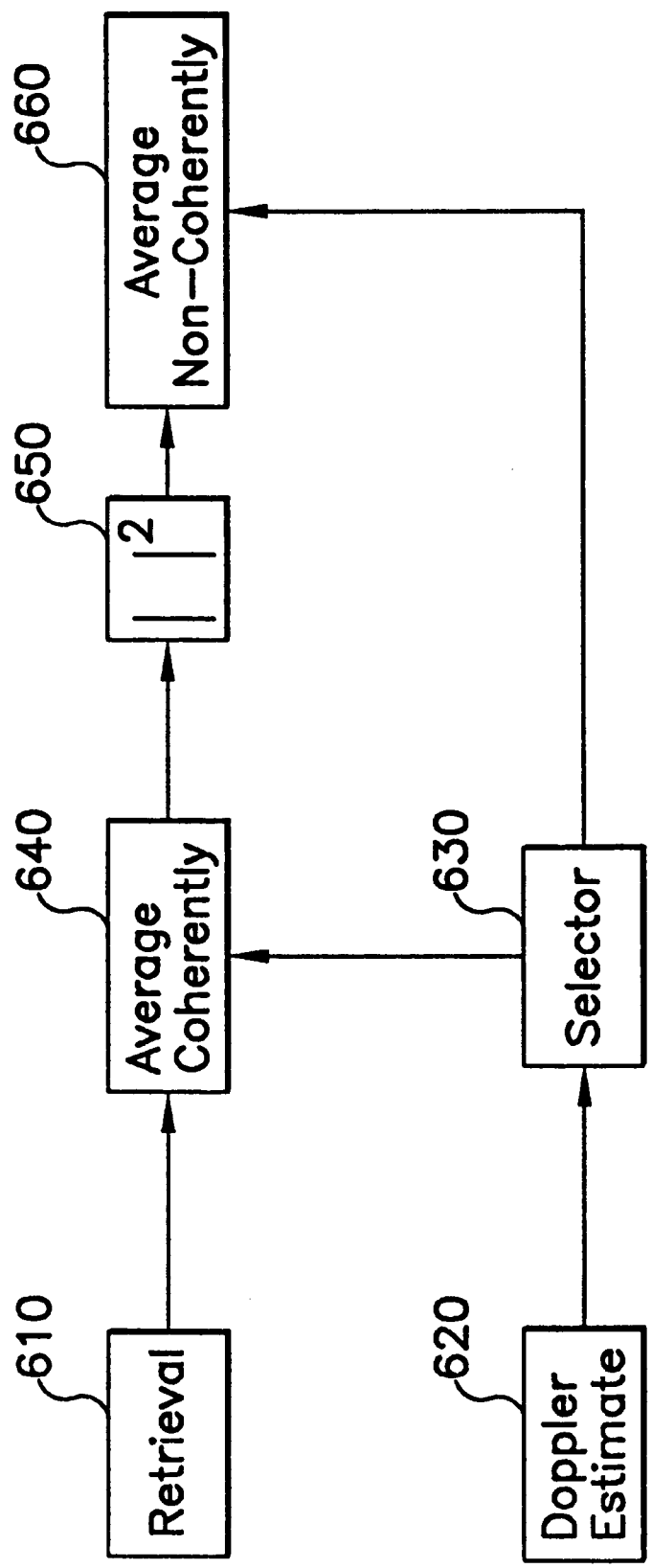
FIG. 6 is a flowchart illustrating the use of Doppler estimation to select the optimum way of averaging symbol powers.

FIG. 6 illustrates how averaging is performed over m symbols, but for different number of coherent averaged symbols. If $$\frac{T_{coh}}{T_s} \approx l > 1$$

for an integer 1 and m/l is an integer, then a better power estimate is provided by the present embodiment.

The radio channel complex amplitude of the signal is accumulated over m symbols after they are detected 610. These symbols are then coherently averaged 640 over m/l intervals before they are being squared 650 and added to other RAKE finger symbol powers. If l<m then the m/l intervals are, in turn, averaged non-coherently 660.

Utilizing the above relations, and an estimate of the Doppler frequency 620, it is possible to select 630 the optimum way of averaging symbol powers by calculating the corresponding coherence time $T_{coh}$ and selecting coherent averaging over the corresponding number of symbols. Methods for estimating the Doppler frequency are beyond the scope of this description. The coherent averaging of the power estimates is then calculated according to the following;

$$\hat{P} = \sum_{i=1}^{p} \frac{1}{m/l} \sum_{n=1}^{m/l} \left| \frac{1}{l} \sum_{j=1}^{l} x_{i,(n-1)l+j} \right|^2$$

for m/l number of symbol periods and for p RAKE fingers.

In FIG. 7A is shown the case when an estimated Doppler frequency has indicated the coherence time $T_{coh}$ to extend over one symbol period. Then, the gain by averaging coherently is negligible and non-coherent averaging is performed. In the above formula m/l=6 and l=1. The non-coherent averaging periods are indicated by upwards extended lines between the symbols illustrated.

FIG. 7B illustrates a situation where the coherence time $T_{coh}$ has been estimated to extend over two symbol periods. Coherent averaging is performed over two symbols according to the formula above. In this case m/l=3 and thus there are 3 separately averaged power estimates which are combined non-coherently to produce an estimate over m symbols. FIG. 7C represents a similar case but with m/l=2, and thus 2 separate coherently averaged estimates to be non-coherently combined.

In FIG. 7D is shown the situation explained in accordance to FIG. 4. Here the Doppler frequency estimates correspond to an estimated coherence time of 6 symbol periods and coherent averaging could be performed over the whole power control averaging period. By considering the coherence time, and changing the number of symbols included in the coherent averaging, dependent on the coherence tire, it is possible to always average over an optimum number of symbols, resulting in accurate power estimates.

Although the present invention has been described with respect to 64-ary modulation and with PN-despreading prior to Walsh Decoding it is easily realized for someone skilled in the art that several variations are possible. For example the Walsh decoding could be performed prior to the PK-despreading. Also, as discussed above, different modulation schemes like DBPSK can also be applied. Similarly, although the embodiments described generally refer to a system compliant to the IS-95 specification, it could equally well be implemented in any other system where non-coherent detection is applied in a DS-CDMA scheme. Therefore, the invention should not be regarded as being limited to the examples described, but should be regarded instead as being equal in scope to the following claims.

What is claimed is:

1. In a Direct Sequence Code Division Multiple Access System (DS-CDMA) having a receiver performing non-coherent detection, a method for estimating received power of a received signal, said method comprising the following steps:

a) correlating a coded symbol in said received signal received in said receiver against an alphabet of allowed symbols and generating channel complex correlation values for each possible value of the received symbol, where possible values are determined by the symbol alphabet;

b) buffering each of the said channel complex correlation values;

c) detecting the received symbols and selecting from the alphabet the symbol most likely received at the receiver;

d) retrieving the complex correlation value corresponding to the selected symbol, wherein the retrieved correlation value forms a channel complex amplitude of the received symbol; and e) repeating the above steps for m times, and coherently averaging over m received code symbols the retrieved channel complex amplitudes to form a power estimate of a signal power received in a receiver.

2. A method according to claim 1 wherein said method further comprises the steps of:

receiving and detecting at least two signal paths in a RAKE receiver; coherently averaging m symbols for each of the received and detected signal paths; and summing the result for each path.

3. A method according to claim 1 wherein said alphabet consists of Walsh symbols.

4. A method according to claim 3 wherein the number of possible said Walsh symbols is 64.

5. A method according to claim 1, where said number m is 6.

6. A method according to claim 1, wherein a transmitter for transmitting said received signal in said DS-CDMA system utilizes a 64-ary orthogonal modulation scheme.

7. A method according claim 1, wherein a transmitter for transmitting said received signal in said DS-CDMA system utilizes a Differential Binary Phase Shift Keying (DBPSK) scheme.

8. A method according to claim 1 wherein the received signal is a user specific signal despread from a composite received signal, said despreading being performed after said correlation, step (a).

9. A method according to claim 1 wherein the received signal is a user specific signal despread from a composite received signal, said despreading being performed before said correlation, step (a).

10. In a Direct Sequence Code Division Multiple Access System (DS-CDMA) having a receiver performing non-coherent detection, a method for estimating received power of a received signal, said signal being received at the receiver, said method comprising the following steps:

a) correlating a coded symbol in said received signal received in a receiver against an alphabet of allowed symbols and generating channel complex correlation values for each possible value of the received symbol, where possible values are determined by the symbol alphabet;

b) buffering each of the said channel complex correlation values;

c) detecting the received symbols and selecting from the alphabet the symbol most likely received at the receiver;

d) retrieving the complex correlation value corresponding to the selected symbol, wherein the retrieved correlation value forms a channel complex amplitude of the received symbol;

e) repeating the above steps a)–d) for periods of m times;

f) estimating a Doppler frequency effective in the transmission of the received signal;

g) from the value of said estimated Doppler frequency, generating an estimate of a coherence time for the period specified by m and the time period for a coded symbol; and h) using said estimate of the coherence time to select a mode of power estimation from a set of possible modes of power estimation, wherein one of said modes corresponds to coherently averaging over m received code symbols the channel complex amplitudes retrieved from retrieving step d) to form a power estimate of a signal power received in a receiver.

11. The method of claim 10 wherein said method further comprises a mode of power estimation, said mode corresponding to coherently averaging over l symbols and generating a power estimate for said l symbols, where said coherent averaging is performed m/l times to produce m/l power estimates, and where the m/l power estimates are further non-coherently averaged to produce a power estimate for m symbols.

12. The method of claim 11 wherein m/l=1, 2, 3, or 6.

13. In a Direct Sequence Code Division Multiple Access System (DS-CDMA) having a receiver performing non-coherent detection, an apparatus for estimating received power of a received signal, said apparatus comprising:

a) means for correlating a coded symbol in said received signal received in said receiver against an alphabet of allowed symbols;

b) means for generating channel complex correlation values for each possible value of the received symbol, where possible values are determined by the symbol alphabet;

c) means for buffering each of the said channel complex correlation values;

d) means for detecting the received symbols and selecting from the alphabet the symbol most likely received at the receiver;

e) means for retrieving the complex correlation value corresponding to the selected symbol, wherein the retrieved correlation value forms a channel complex amplitude of the received symbol; and f) means for repeating the above steps for m times, and coherently averaging over m received code symbols the retrieved channel complex amplitudes to form a power estimate of a signal power received in a receiver.

14. In a Direct Sequence Code Division Multiple Access System (DS-CDMA) having a receiver performing non-coherent detection, an apparatus for estimating received power of a received signal, said signal being received at the receiver, said apparatus comprising:

a) means for correlating a coded symbol in said received signal received in a receiver against am alphabet of allowed symbols;

b) means for generating channel complex correlation values for each possible value of the received symbol, where possible values are determined by the symbol alphabet;

c) means for buffering each of the said channel complex correlation values;

d) means for detecting the received symbols and selecting from the alphabet the symbol most likely received at the receiver;

e) means for retrieving the complex correlation value corresponding to the selected symbol, wherein the retrieved correlation value forms a channel complex amplitude of the received symbol;

f) means for repeating the above steps a)–d) for periods of m times;

g) means for estimating a Doppler frequency effective in the transmission of the received signal;

h) means for generating, from the value of said estimated Doppler frequency, an estimate of a coherence time for the period specified by m and the time period for a coded symbol; and i) means for using said estimate of the coherence time to select a mode of power estimation from a set of possible modes of power estimation, wherein one of said modes corresponds to coherently averaging over n received code symbols the channel complex amplitudes retrieved from retrieving step d) to form a power estimate of a signal power received in a receivers.

15. The apparatus of claim 14 wherein the means for using said estimate of the coherence time to select a mode of power estimation from a set of possible modes of power estimation further comprises:

a) means to select a mode of power estimation corresponding to coherently averaging over l symbols and generating a power estimate for said l symbols;

b) means to perform m/l coherently averaged power estimates; and c) means to combine said m/l coherently averaged power estimates non-coherently, to generate a power estimate for m symbols.

* * * * *